United States Patent
Okazaki

(10) Patent No.: US 7,904,196 B2
(45) Date of Patent: Mar. 8, 2011

(54) METHOD AND APPARATUS FOR CONTROLLING PRESSURE IN ELECTRIC INJECTION MOLDING MACHINE

(75) Inventor: Yoshinori Okazaki, Yamaguchi (JP)

(73) Assignee: Ube Machinery Corporation, Ltd. (JP)

( * ) Notice: Subject to any disclaimer, the term of this patent is extended or adjusted under 35 U.S.C. 154(b) by 36 days.

(21) Appl. No.: 12/563,613

(22) Filed: Sep. 21, 2009

(65) Prior Publication Data

US 2010/0032854 A1 Feb. 11, 2010

Related U.S. Application Data

(63) Continuation of application No. 10/541,470, filed as application No. PCT/JP2004/013318 on Sep. 13, 2004, now abandoned.

(30) Foreign Application Priority Data

Sep. 17, 2003 (JP) .................................. 2003-324893

(51) Int. Cl.
*B29C 45/00* (2006.01)
*B29B 15/00* (2006.01)
*B29C 47/92* (2006.01)
*B29C 47/76* (2006.01)

(52) U.S. Cl. ....... 700/203; 264/40.4; 264/40.7; 425/145; 425/149; 425/150

(58) Field of Classification Search ................ 264/40.4, 264/40.7; 700/203; 425/145, 149, 150
See application file for complete search history.

(56) References Cited

U.S. PATENT DOCUMENTS

| 4,759,705 | A | | 7/1988 | Otake et al. |
| 4,887,012 | A | | 12/1989 | Kiya et al. |
| 5,013,231 | A | * | 5/1991 | Fujita et al. .................. 425/145 |
| 5,102,587 | A | | 4/1992 | Kumamura et al. |
| 5,296,179 | A | * | 3/1994 | Kamiguchi et al. ......... 264/40.1 |
| 5,362,222 | A | | 11/1994 | Faig et al. |
| 5,645,775 | A | * | 7/1997 | Spahr et al. .................. 264/40.5 |
| 5,728,329 | A | | 3/1998 | Guergov |
| 5,911,924 | A | | 6/1999 | Siegrist et al. |
| 6,562,264 | B1 | | 5/2003 | Taniguchi et al. |
| 6,682,669 | B2 | * | 1/2004 | Bulgrin et al. ............... 264/40.1 |
| 6,695,994 | B2 | | 2/2004 | Bulgrin et al. |
| 2003/0062643 | A1 | | 4/2003 | Bulgrin et al. |
| 2004/0047935 | A1 | * | 3/2004 | Moss et al. .................... 425/145 |

FOREIGN PATENT DOCUMENTS

| JP | 09220748 | 8/1997 |
| JP | 09-277325 | 10/1997 |
| JP | 10-044206 | 2/1998 |

* cited by examiner

*Primary Examiner* — Albert Decady
*Assistant Examiner* — Thomas Stevens
(74) *Attorney, Agent, or Firm* — Clark Hill PLC

(57) ABSTRACT

A rotational angle of a motor operative to propel forward a screw in an injection molding machine is detected at an encoder. An output from the encoder is employed to obtain an angular velocity $\omega$ of the motor. From the obtained angular velocity $\omega$, an estimated melt pressure value $\hat{\delta}$ that contains no differential term is derived using a certain observer theory. The estimated melt pressure value $\hat{\delta}$ is employed to calculate a torque command value $T^{CMD}$ for the motor, which is fed back to the motor. Thus, precise propelling power control unaffected by noises can be executed without the use of a pressure sensor such as a load cell.

3 Claims, 14 Drawing Sheets

FIG. 8

$$\frac{d}{dt}\begin{pmatrix}\hat{\omega}\\ \hat{\delta}\end{pmatrix} = \begin{pmatrix}d_1 & 1/J\\ d_2 & 0\end{pmatrix}\begin{pmatrix}\hat{\omega}\\ \hat{\delta}\end{pmatrix} + \begin{pmatrix}1/J\\ 0\end{pmatrix}T_{CMD} + \begin{pmatrix}1/J\\ 0\end{pmatrix}F(\omega) - \begin{pmatrix}d_1\\ d_2\end{pmatrix}\omega$$

FIG. 9

$$\frac{d}{dt}\begin{pmatrix}\hat{\omega}^M \\ \hat{\omega}^L \\ \hat{F} \\ \hat{\delta} \\ \hat{\sigma}\end{pmatrix} = \begin{pmatrix} d_1 & 0 & 0 & -\frac{R^M}{J^M} & 0 \\ d_2 & 0 & 0 & \frac{R^L}{J^L} & \frac{1}{J^L} \\ d_3 - K_b R^M & -K_b R^L & 0 & 0 & 0 \\ d_4 & K_w & 0 & 0 & \frac{K_{wl}}{J^L} \\ d_5 & 0 & 0 & 0 & 0 \end{pmatrix}\begin{pmatrix}\hat{\omega}^M \\ \hat{\omega}^L \\ \hat{F} \\ \hat{\delta} \\ \hat{\sigma}\end{pmatrix} + \begin{pmatrix}\frac{1}{J^M} \\ 0 \\ 0 \\ 0 \\ 0\end{pmatrix}T^{CMD} - \begin{pmatrix}0 \\ \frac{1}{J^L} \\ 0 \\ \frac{K_{wl}}{J^L} \\ 0\end{pmatrix}F_d(\omega^L) - \begin{pmatrix}d_1 \\ d_2 \\ d_3 \\ d_4 \\ d_5\end{pmatrix}\omega^M
$$

FIG. 10

$$\frac{d}{dt}\begin{bmatrix}\omega^M\\\omega^L\\F\\\delta\\\sigma\end{bmatrix}=\begin{bmatrix}0 & 0 & -\frac{R^M}{J^M} & 0 & 0\\0 & 0 & \frac{R^L}{J^L} & \frac{1}{J^L} & 0\\K_b R^M & -K_b R^L & 0 & 0 & 0\\0 & K_w & \frac{K_{wd}R^L}{J^L} & \frac{K_{wd}}{J^L} & 1\\0 & 0 & 0 & 0 & 0\end{bmatrix}\begin{bmatrix}\omega^M\\\omega^L\\F\\\delta\\\sigma\end{bmatrix}+\begin{bmatrix}\frac{1}{J^M}\\0\\0\\0\\0\end{bmatrix}T^{CMD}+\begin{bmatrix}0\\\frac{1}{J^L}\\0\\\frac{K_{wd}}{J^L}\\0\end{bmatrix}F_d(\omega^L)$$

FIG. 11

$$\frac{d}{dt}\begin{pmatrix}\hat{\omega}^M\\\hat{\omega}^L\\\hat{F}\\\hat{\delta}\\\hat{\sigma}\end{pmatrix}=\begin{pmatrix}d_1 & 0 & -\frac{R^M}{J^M} & 0 & 0\\d_2 & 0 & \frac{R^L}{J^L} & \frac{1}{J^L} & 0\\d_3+K_\delta R^M & -K_\delta R^L & 0 & 0 & 0\\d_4 & K_\omega & \frac{K_{\omega d} R^L}{J^L} & \frac{K_{\omega d}}{J^L} & 0\\d_5 & 0 & 0 & 0 & 0\end{pmatrix}\begin{pmatrix}\hat{\omega}^M\\\hat{\omega}^L\\\hat{F}\\\hat{\delta}\\\hat{\sigma}\end{pmatrix}+\begin{pmatrix}\frac{1}{J^M}\\0\\0\\0\\0\end{pmatrix}T^{CMD}+\begin{pmatrix}0\\\frac{1}{J^L}\\0\\\frac{K_{\omega d}}{J^L}\\0\end{pmatrix}F_d(\omega^L)-\begin{pmatrix}d_1\\d_2\\d_3\\d_4\\d_5\end{pmatrix}\omega^M$$

FIG. 12

$$\hat{\omega}^M = \hat{\omega}^M_{-1} + \left\{ d_1\left(\hat{\omega}^M_{-1} - \omega^M\right) + \frac{1}{J^M}\left(T^{CMD}_{-1} - R^M \hat{F}_{-1}\right) \right\} dt$$

$$\hat{\omega}^L = \hat{\omega}^L_{-1} + \left\{ d_2\left(\hat{\omega}^M_{-1} - \omega^M\right) + \frac{1}{J^L}\left(R^L \hat{F}_{-1} + \hat{\delta}_{-1} + F_d\left(\omega^L\right)\right) \right\} dt$$

$$\hat{F} = \hat{F}_{-1} + \left\{ d_3\left(\hat{\omega}^M_{-1} - \omega^M\right) + K_\delta\left(R^M \hat{\omega}^M_{-1} - R^L \hat{\omega}^L_{-1}\right) \right\} dt$$

$$\hat{\delta} = \hat{\delta}_{-1} + \left\{ d_4\left(\hat{\omega}^M_{-1} - \omega^M\right) + K_w \hat{\omega}^L_{-1} - \frac{K_{wd}}{J^L}\left(R^L \hat{F}_{-1} + \hat{\delta}_{-1} + F_d\left(\omega^L\right)\right) + \hat{\sigma}_{-1} \right\} dt$$

$$\hat{\sigma} = \hat{\sigma}_{-1} + d_5\left(\hat{\omega}^M_{-1} - \omega^M\right) dt$$

FIG. 13

$$\frac{d}{dt}\begin{pmatrix}\omega^M \\ \omega^L \\ F \\ \delta\end{pmatrix} = \begin{pmatrix} 0 & 0 & K_3 R^M & 0 \\ 0 & 0 & -K_3 R^L & 0 \\ -\frac{R^M}{J^M} & \frac{R^L}{J^L} & 0 & 0 \\ 0 & \frac{1}{J^L} & 0 & 0 \end{pmatrix}\begin{pmatrix}\omega^M \\ \omega^L \\ F \\ \delta\end{pmatrix} + \begin{pmatrix}\frac{1}{J^M} \\ 0 \\ 0 \\ 0\end{pmatrix}T_{CMD} + \begin{pmatrix}0 \\ \frac{1}{J^L} \\ 0 \\ 0\end{pmatrix}F_d(\omega^L)$$

FIG. 14

$$\frac{d}{dt}\begin{pmatrix}\hat{\omega}^M \\ \hat{\omega}^L \\ \hat{F} \\ \hat{\delta}\end{pmatrix} = \begin{pmatrix}-\frac{R^M}{J^M} & 0 & 0 & 0 \\ \frac{R^L}{J^L} & 0 & 0 & 0 \\ 0 & 0 & -K_5 R^L & 0 \\ 0 & 0 & 0 & 0\end{pmatrix}\begin{pmatrix}\hat{\omega}^M \\ \hat{\omega}^L \\ \hat{F} \\ \hat{\delta}\end{pmatrix} + \begin{pmatrix}\frac{1}{J^M} \\ 0 \\ 0 \\ 0\end{pmatrix}T^{CMD} + \begin{pmatrix}0 \\ \frac{1}{J^L} \\ 0 \\ 0\end{pmatrix}F_a(\omega^L) - \begin{pmatrix}d_1 \\ d_2 + K_5 R^M \\ d_3 \\ d_4\end{pmatrix}\omega^M
\begin{pmatrix}d_1 \\ d_2 \\ d_3 \\ d_4\end{pmatrix}\omega^M$$

FIG. 15

$$\hat{\omega}^M = \hat{\omega}^M_{-1} + \int \left\{ d_1(\hat{\omega}^M_{-1} - \omega^M) \right\} + \frac{1}{J^M}\left(T^{CMD}_{-1} - R^M \hat{F}_{-1}\right)\right\} dt$$

$$\hat{\omega}^L = \hat{\omega}^L_{-1} + \int \left\{ d_2(\hat{\omega}^M_{-1} - \omega^M) \right\} + \frac{1}{J^L}\left(R^L \hat{F}_{-1} + \hat{\delta}_{-1} + F_G(\omega^L_{-1})\right)\right\} dt$$

$$\hat{F} = \hat{F}_{-1} + \int \left\{ d_3(\hat{\omega}^M_{-1} - \omega^M) + K_b\left(R^M \hat{\omega}^M_{-1} - R^L \hat{\omega}^L_{-1}\right)\right\} dt$$

$$\hat{\delta} = \hat{\delta}_{-1} + \int d_4(\hat{\omega}^M_{-1} - \omega^M) dt$$

METHOD AND APPARATUS FOR CONTROLLING PRESSURE IN ELECTRIC INJECTION MOLDING MACHINE

TECHNICAL FIELD

The present invention relates to a method and apparatus for controlling pressure in an electric injection molding machine.

BACKGROUND ART

A typical electric molding machine employed in the art senses pressure using a pressure sensor in a control target (such as mold open/close, extrusion, and nozzle touch) and, based on a signal from the pressure sensor, configures a closed-loop control circuit to control the propelling power.

Specifically, for control of injection pressure, a load cell is arranged at the root of a screw, for example, to sense a force that pushes the screw (a forward force) in the form of pressure by the load cell. Then, based on the sensed pressure, feedback control is applied such that the pressure to be sensed at the load cell reaches a desired pressure value, thereby controlling the propelling power of the screw.

A measured signal output from a general pressure sensor such as the load cell is a weak analog signal. An electric injection molding machine includes a large number of motorized instruments that also act as noise sources. Accordingly, noises caused from the motorized instruments may superimpose on the weak analog signal output from the load cell. In this case, the propelling power may not be controlled well as a phenomenon. Therefore, devices such as multistage noise filters are located on an analog signal line from the load cell to prevent a noise-caused control failure. Nevertheless, it is extremely difficult to completely eliminate such the control failure.

For adjustment of the load cell, manual works such as zero-point adjustment of an amp and span adjustment are required. Therefore, depending on adjusters, adjusted conditions may differ subtly and result in individually different controlled conditions as a problem.

For that reason, based on an angular velocity or rotational angle and a drive current or torque of an electric motor, a current melt pressure value for use in melt pressure control is estimated using state equations. Such a sensorless melt pressure estimating method has been disclosed (in Patent Document 1: U.S. Pat. No. 6,695,994). In the melt pressure estimating method, state equations indicative of the force exerted on the resin (melt) from forward movement of the ram may be given as shown in Expression 1 (see FIGS. 9-13).

E1: $P_{MELT} = F_{inj}/A_{BARREL}$

E2: $F_{inj} = (2\pi e_S e_B N_{SP}/lN_{MP})[(T_2 - J_{TOT}\alpha) - T_U] - F_{LOSS}$ E3: $\alpha = \omega'$    [Expression 1]

In this expression, E1 is a melt pressure equation, E2 is an injection force equation, and E3 is a motor acceleration equation, with $P_{MELT}$: Melt pressure value, $F_{inj}$: Injection force, $A_{BARREL}$: Barrel area, $e_S$: Ball screw efficiency, $e_B$: Belt efficiency, $N_{SP}/N_{MP}$: Diameter ratio of Transmission pulleys at Ball screw and Motor, l: Ball screw lead, $T_2$: Measured torque value, $J_{TOT}$: Inertia moment, $\alpha$: Motor angular acceleration, $T_U$: Support bearing frictional torque, $F_{LOSS}$: Loss force, and $\omega$: Angular velocity.

In the melt pressure estimating method disclosed in the above-described Patent Document 1, for estimation of the melt pressure, the obtained torque command value and angular velocity associated with the motor are employed to directly solve the state equations shown in Expression 1 to obtain the melt pressure $P_{MELT}$. Accordingly, the Expression includes a differential term denoted with E3, which lowers the resistance against the noises. As a result, a precise melt pressure control is made difficult as a problem.

The present invention has been made in consideration of such the problem and has an object to provide a method and apparatus for controlling pressure in an electric injection molding machine, which is capable of achieving precise propelling power control without the use of a pressure sensor such as a load cell.

DISCLOSURE OF THE INVENTION

The present invention provides a method of controlling pressure in an electric injection molding machine, comprising: detecting an angular velocity $\omega$ of a motor operative to propel forward a screw in an injection molding machine; deriving an estimated melt pressure value $\hat{\delta}$, based on an observer, from the detected angular velocity $\omega$ of the motor and a torque command value $T^{CMD}$ given to the motor; and controlling the motor such that the estimated melt pressure value $\hat{\delta}$ follows a melt pressure setting $\delta^{REF}$.

The "observer (observed state value)" defined in the present invention is an equation for obtaining an estimated value of a state variable by solving a differential equation expressed to estimate a state variable (converge at a state variable) such that a control target output coincides with a model output. The "observer" of the present invention thus made by previously solving the differential equation is not required to execute differentiation on actually obtaining the estimated melt pressure value $\hat{\delta}$.

The observer may be represented by Expression 2, which is depicted in FIG. 8,
where
 $\hat{\omega}$: Estimated value of Angular velocity of Motor
 $d_1, d_2$: Certain coefficients
 J: Inertia moment over Injection mechanism
 $F(\omega)$: Dynamic frictional resistance and Static frictional resistance over Injection mechanism The screw in the injection molding machine and the motor may be coupled together via a belt suspended around pulleys mounted on respective rotation shafts. In such the case, the observer can be represented by Expression 3, which is depicted in FIG. 9,
where
 $d_1$-$d_6$: Certain coefficients
 $J^M$: Inertia moment at Motor side
 $\omega^M$: Angular velocity of Motor
 $R^M$: Pulley radius at Motor side
 F: Tension of Belt
 $K_b$: Spring constant of Belt
 $J^L$: Inertia moment at Screw side
 $\omega^L$: Angular velocity at Screw side
 $R^L$: Pulley radius at Screw side
 $F_d(\omega^L)$: Dynamic frictional resistance at Screw side
 $K_w$: Elastic modulus of Resin
 $K_{wd}$: Coefficient of Viscosity of Resin
 $\sigma$: Force of Screw pushing Resin The present invention provides another apparatus for controlling pressure in an electric injection molding machine, comprising: an observer arithmetic unit operative to derive a value, an estimated melt pressure value $\hat{\delta}$, based on an observer, from an angular velocity $\omega$ of a motor operative to propel forward a screw in an injection molding machine and a torque command value $T^{CMD}$ given to the motor; and a torque arithmetic unit operative to calculate the torque command value $T^{CMD}$ for the motor based on the above Expression 3 using the estimated melt pressure value $\hat{\delta}$ derived at the observer arithmetic unit and feed back the torque command value to the motor.

The "melt pressure" as in the estimated melt pressure value $\hat{\delta}$ and the melt pressure setting $\delta^{REF}$ is defined as the force of the screw in the injection molding machine that pushes the melt (resin), which differs from the force detected at the load cell in the art that pushes the screw. In a word, the control target in the control of screw propelling power is different in the art from the present invention.

In accordance with the present invention, an angular velocity $\omega$ of the motor operative to propel forward the screw in the injection molding machine is obtained. An estimated melt pressure value $\hat{\delta}$ is derived from the obtained angular velocity $\omega$ using the observer theory. The motor is then controlled such that the estimated melt pressure value $\hat{\delta}$ follows the melt pressure setting $\delta^{REF}$. Thus, the melt pressure can be controlled precisely without the use of any pressure sensor such as a load cell.

In addition, in the present invention a higher resistance against noises is achieved because the equation for calculating the estimated melt pressure value $\hat{\delta}$ contains no differential term.

BRIEF DESCRIPTION OF THE DRAWINGS

FIGS. 8-15 depict different expressions or equations referenced herein.

BEST MODE FOR CARRYING OUT THE INVENTION

The embodiments of the present invention will now be described based on the drawings.

Figure 1:
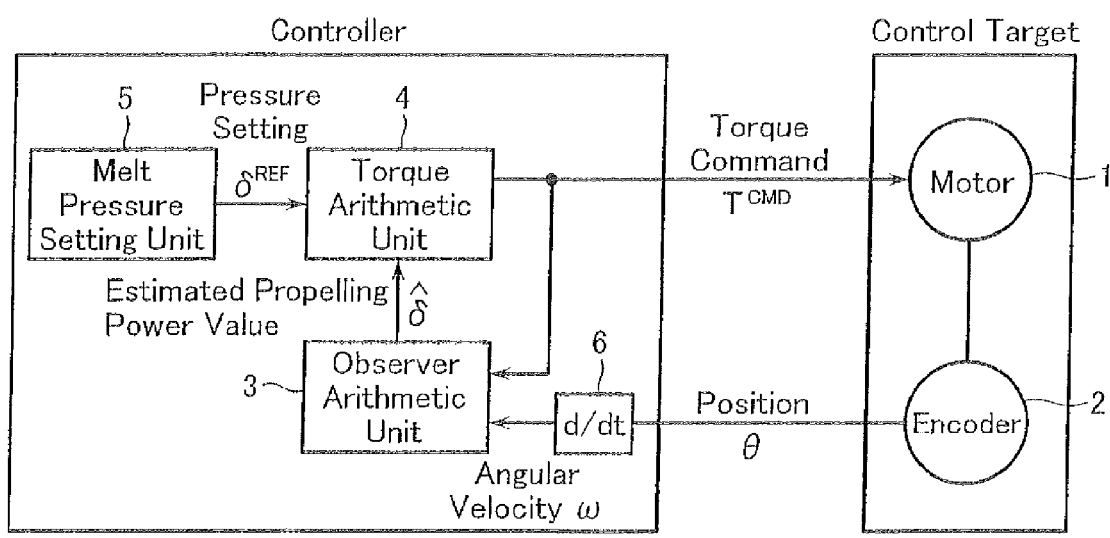
FIG. 1 is a block diagram of a controller for an electric injection molding machine according to an embodiment of the present invention.

FIG. 1 is a block diagram showing a configuration of a pressure controller for an electric injection molding machine according to an embodiment of the present invention.

A control target or motor 1 is an injection motor operative to move a screw back and forth in an injection cylinder, not shown. The motor 1 is equipped with an encoder 2, which detects positional information (rotational angle) $\theta$ of the motor and provides it to external. The positional information $\theta$ from the encoder 2 is converted at a differentiator 6 into an angular velocity $\omega$, which is then fed to an observer arithmetic unit 3. The observer arithmetic unit 3 estimates the propelling power of the screw (melt pressure) $\delta$ based on the output $\omega$ from the differentiator 6. Based on a melt pressure setting $\delta^{REF}$ set at a melt pressure setting unit 5 and an estimated melt pressure value $\hat{\delta}$ derived at the observer arithmetic unit 3, a torque arithmetic unit 4 obtains a torque command value $T^{CMD}$, which is fed back to the control target or motor 1.

The following description is given to operation of the controller.

In general, an equation shown in the following Expression 4 has been known as a state equation for an injection mechanism.

$$J\omega' = T^{CMD} + \delta + F(\omega) \quad \text{[Expression 4]}$$

In this equation,

J: Inertia moment over Injection mechanism
$\omega'$: Angular acceleration of Motor
$\omega$: Angular velocity of Motor
$T^{CMD}$: Torque command value
$\delta$: Melt pressure
$F(\omega)$: Dynamic frictional resistance and Static frictional resistance over Injection mechanism In consideration of the above Expression 4 and on the assumption that $\delta'$ (differentiated value of $\delta$) is equal to zero, the following Expression is given.

$$\frac{d}{dt}\begin{pmatrix}\omega\\\delta\end{pmatrix} = \begin{pmatrix}0 & \frac{1}{J}\\0 & 0\end{pmatrix}\begin{pmatrix}\omega\\\delta\end{pmatrix} + \begin{pmatrix}\frac{1}{J}\\0\end{pmatrix}T^{CMD} + \begin{pmatrix}\frac{1}{J}\\0\end{pmatrix}F(\omega) \quad \text{[Expression 5]}$$

The observer (observed state value) is herein defined as the following Expression 6.

$$\frac{d}{dt}\begin{pmatrix}\hat{\omega}\\\hat{\delta}\end{pmatrix} = \begin{pmatrix}d_1 & \frac{1}{J}\\d_2 & 0\end{pmatrix}\begin{pmatrix}\hat{\omega}\\\hat{\delta}\end{pmatrix} + \begin{pmatrix}\frac{1}{J}\\0\end{pmatrix}T^{CMD} + \begin{pmatrix}\frac{1}{J}\\0\end{pmatrix}F(\omega) - \begin{pmatrix}d_1\\d_2\end{pmatrix}\omega \quad \text{[Expression 6]}$$

In this equation, $\hat{\omega}$: Estimated value of Angular velocity of Motor 1
$\hat{\delta}$: Estimated value of Melt pressure (Propelling power)

The above Expression 6 gives the following Expression 7.

$$d\hat{\omega}/dt = d_1\hat{\omega} + (1/J)\hat{\delta} + (1/J)T^{CMD} - d_1\omega + (1/J)F(\omega)$$

$$d\hat{\delta}/dt = d_2\hat{\omega} - d_2\omega \quad \text{[Expression 7]}$$

When a sampling (or processing) period is represented as dt, and data x at a sampling (or processing) period immediately before is represented as $x_{-1}$, the following is given.

$$d\hat{\omega}/dt = (\hat{\omega} - \hat{\omega}_{-1})/dt$$

$$d\hat{\delta}/dt = (\hat{\delta} - \hat{\delta}_{-1})/dt \quad \text{[Expression 8]}$$

Accordingly, the estimated angular velocity $\hat{\omega}$ and the estimated melt pressure value $\hat{\delta}$ are represented as the following Expression 9.

$$\hat{\omega} = \hat{\omega}_{-1} + (d\hat{\omega}/dt)dt$$

$$\hat{\delta} = \hat{\delta}_{-1} + (d\hat{\delta}/dt)dt \quad \text{[Expression 9]}$$

Substitution of Expression 7 into Expression 9 yields the following Expression 10.

$$\hat{\omega} = \hat{\omega}_{-1} + \int \begin{Bmatrix} d_1(\hat{\omega}_{-1} - \omega) + \left(\frac{1}{J}\right) \\ (T_{-1}^{CMD} + \hat{\delta}_{-1} + F(\omega)) \end{Bmatrix} dt \quad \text{[Expression 10]}$$

$$\hat{\delta} = \hat{\delta}_{-1} + \int \{d_2(\hat{\omega}_{-1} - \omega)\} dt$$

$$\begin{pmatrix} \omega - \omega^{\wedge} \\ \delta - \delta^{\wedge} \end{pmatrix} = x \quad \text{[Expression 11]}$$

$$\begin{pmatrix} d_1 & \frac{1}{J} \\ d_2 & 0 \end{pmatrix} = \Lambda$$

This replacement gives the following.

$$dx/dt = Ax$$

$$x = e^{At} \quad \text{[Expression 12]}$$

If the eigenvalue of A has a negative real number, then $x \to 0$ when $t \to \infty$. Namely, the following is given.

$$\omega = \hat{\omega}$$

$$\delta = \hat{\delta} \quad \text{[Expression 13]}$$

In this case, measured values of $\omega$, $\delta$ coincide with estimated values thereof. Accordingly, $d_1$, $d_2$ may be determined such that the real number in the eigenvalue of A becomes negative.

Figure 2:
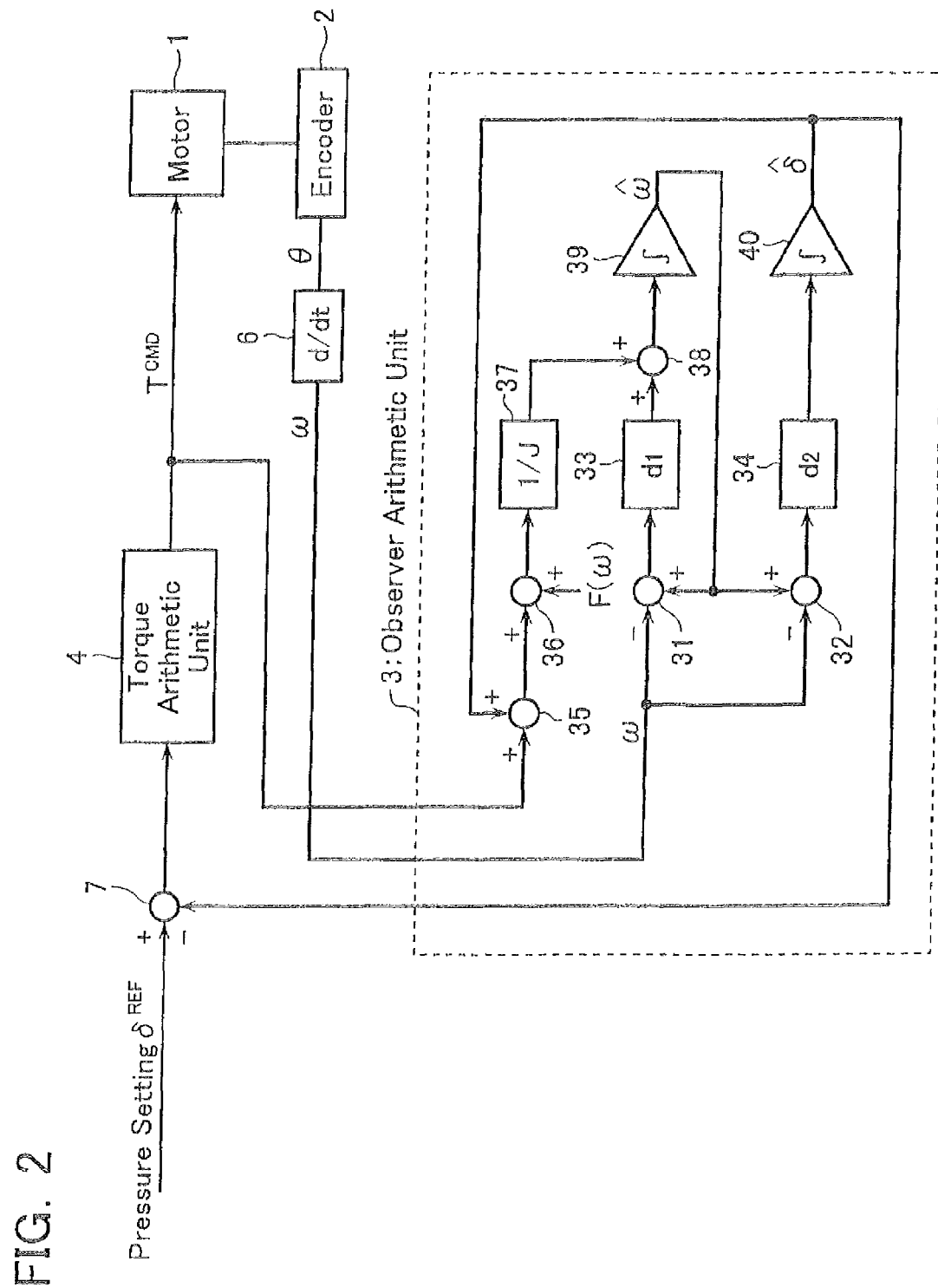
FIG. 2 is a detailed block diagram of the controller.

FIG. 2 is a block diagram showing details of the observer arithmetic unit 3.

The positional information $\theta$ output from the encoder 2 is differentiated at the differentiator 6 into the angular velocity $\omega$. This angular velocity is then subtracted at both adders 31 and 32 from an estimated angular velocity value $\hat{\omega}_{-1}$, obtained at immediately preceding processing, to provide $(\hat{\omega}_{-1} - \omega)$, which is sent through adjusters 33 and 34 and adjusted into amplitude corresponding to coefficients $d_1$ and $d_2$.

On the other hand, a torque command value $T^{CMD}_{-1}$ and an estimated melt pressure value $\hat{\delta}_{-1}$, obtained immediately before, are summed at an adder 35. To this sum, the dynamic frictional resistance and static frictional resistance over the injection mechanism, $F(\omega)$, is further added at an adder 36. The sum from the adder 36 is sent through an adjuster 37 and adjusted into amplitude corresponding to a coefficient $1/J$. This adjusted value is added at an adder 38 with the output from the adjuster 33. Thus, the content between brackets { } in the second term on the right side in the upper equation of the Expression 10 can be obtained. Similarly, the content between brackets { } in the second term on the right side in the lower equation of the Expression 10 can be obtained based on the output from the adjuster 35.

These values are integrated at integrators 39 and 40, respectively, to obtain the estimated values $\hat{\omega}$ and $\hat{\delta}$ based on Expression 10.

The estimated melt pressure value $\hat{\delta}$ thus obtained is subtracted from a target pressure setting $\delta^{REF}$ at an adder 7 and the resultant difference is fed to the torque arithmetic unit 4. The torque arithmetic unit 4 computes a torque command value $T^{CMD}$ based on the following Expression 14 in the simplest, which is fed back to the motor 1.

$$T^{CMD} = kp(\delta^{REF} - \hat{\delta}) \quad \text{[Expression 14]}$$

In this equation,
$\delta^{REF}$: Melt pressure setting
kp: Certain constant

Preferably, the torque command value $T^{CMD}$ may be computed based on the following Expression 15 and fed back to the motor 1.

$$T^{CMD} = kp(\delta^{REF} - \hat{\delta}) + ki\int(\delta^{REF} - \hat{\delta})dt \quad \text{[Expression 15]}$$

In this equation,
ki: Certain constant

As described above, in the present invention, the equation of motion in Expression 11 is solved using the observer theory to calculate the melt pressure $\hat{\delta}$. Therefore, any pressure sensor such as a load cell is not required. In addition, the inertia moment J and the dynamic frictional resistance and static frictional resistance $F(\omega)$ herein employed are unique parameters of the injection mechanism. Accordingly, the control can be executed independent of the molding resin.

The dynamic frictional resistance can be derived from a relation between a torque of the motor and an advancing speed of the screw. Namely, the dynamic frictional resistance is derived from a torque command and a measured value of the injection speed (calculated from the encoder output) at the time when the screw is advanced under no load (without any resin). The tensed condition of the belt that couples the motor and the pulleys in the electric injection molding machine may vary the dynamic frictional resistance possibly. Accordingly, periodic recalculations and updates are desired.

Figure 3:
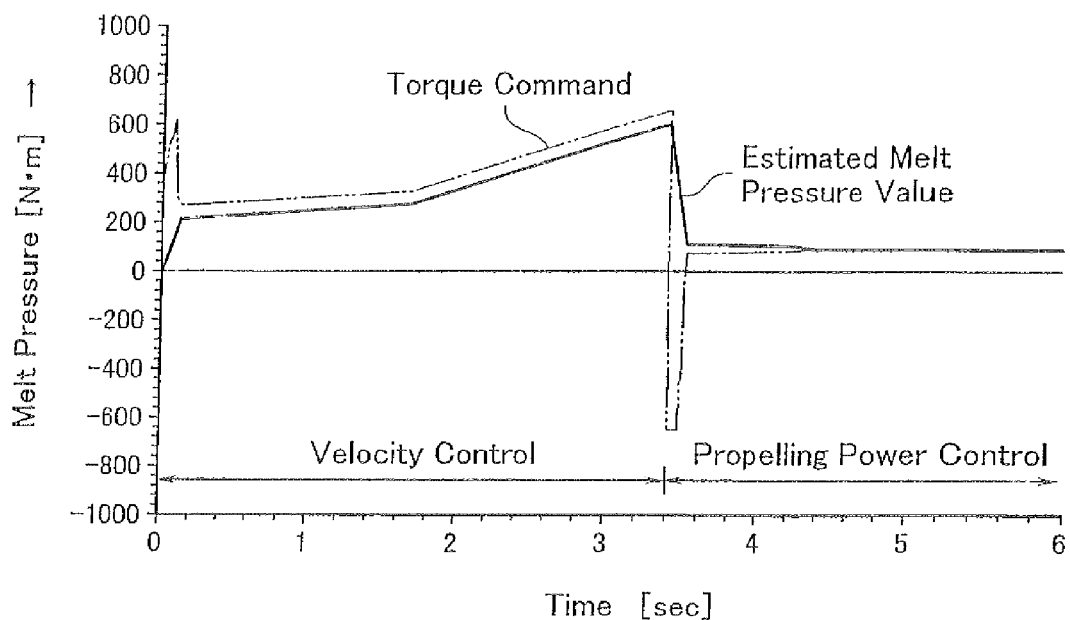
FIG. 3 is a graph showing variations over time in torque command value for the controller and in estimated propelling power value.

FIG. 3 is a graph showing the torque command value $T^{CMD}$ and the estimated melt pressure value $\hat{\delta}$ obtained when the injection molding is performed actually using the controller according to the embodiment. The first half shows the injection step from the beginning of filling a resin into a mold until almost the completion of filling while the screw is velocity-controlled. The second half shows the retaining step after the mold is almost filled with the resin while the screw is propelling power-controlled. In the shown example, the estimated melt pressure value rises up to 600 N·m during the velocity control period and the estimated melt pressure value is retained at 100 N·m in the retaining step.

Thus, in accordance with the present invention, a highly precise pressure control can be achieved.

The above can be suitably used when a delay in the transmission system from the motor to the screw is negligible, for example, when the motor is directly connected to the screw, or when the motor is linked to the screw via a high-stiffness system such as gears.

Figure 4:
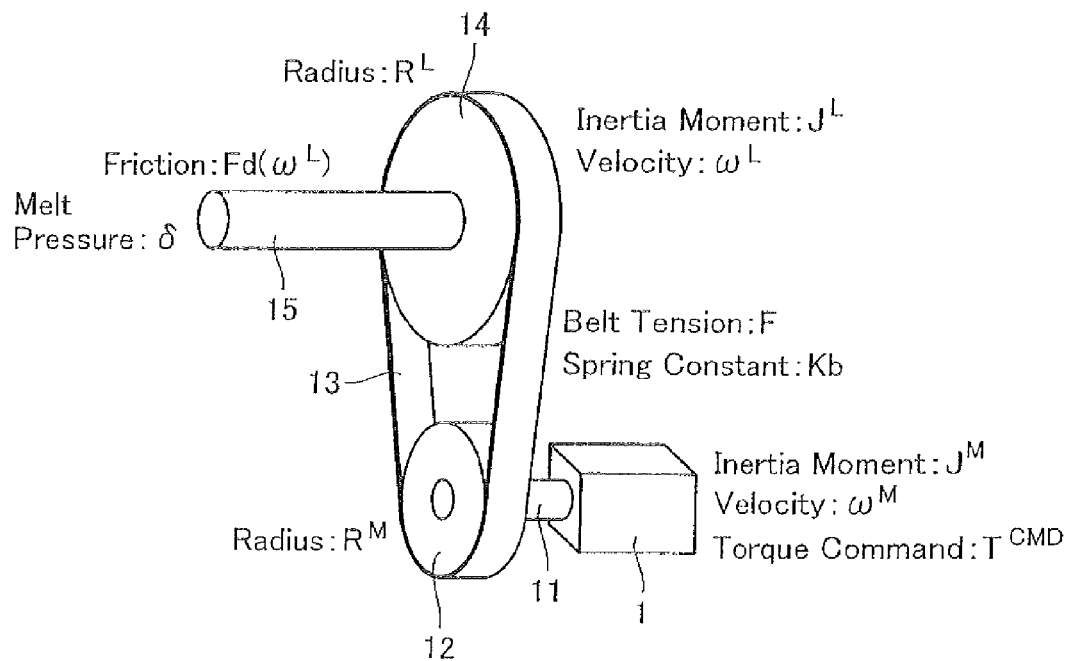
FIG. 4 is an illustrative view of a transmission system in an electric injection molding machine according to another embodiment of the present invention.

In the actual electric injection molding machine, however, the delay in the transmission system from the motor to the screw may not be negligible. For example, as shown in FIG. 4, a rotational shaft 11 of the motor 1 is coupled to a pulley 12, then the pulley 12 is linked via a belt 13 to a load-side pulley 14, and a rotational shaft 15 of the pulley 14 rotates to drive the screw rotationally. In this case, it is required to consider the inertia moment $J^M$, the angular velocity $\omega^M$ and the pulley radius $R^M$ at the motor 1; the tension F and the spring constant $K_b$ of the belt 13; and the inertia moment $J^L$, the angular velocity $\omega^L$, the pulley radius $R^L$ and the dynamic frictional resistance $F_d(\omega^L)$ at the load.

State equations established in consideration of the transmission system are represented by the following Expression 16.

$$J^M \dot{\omega}^M = T^{CMD} - FR^M$$

$$J^L \dot{\omega}^L = FR^L + \delta + F_d(\omega^L)$$

$$F' = K_b(R^M \omega^M - R^L \omega^L) \quad \text{[Expression 16]}$$

The differentiated value δ' of the melt pressure δ is defined as Expression 17 where the elastic modulus of the resin is herein represented as $K_w$, the coefficient of viscosity as $K_{wd}$ and the force of the screw pushing the resin as σ.

$$\delta' = K_w \omega^L + K_{wd} \omega^{L'} + \sigma \quad \text{[Expression 17]}$$

The Expressions 16 and 17 can be modified as Expression 18, which is depicted in FIG. 10.

The observer (observed state value) is herein defined as Expression 19, which is depicted in FIG. 11.

Also in this case, Expression 20, which is depicted in FIG. 12, can be derived in the same manner as the Expression 10 is derived from the Expressions 7-9.

When the differentiated value of the melt pressure δ is δ'=0, the Expression 16 can be expressed as Expression 21, which is depicted in FIG. 13.

The observer (observed state value) is herein defined as Expression 22, which is depicted in FIG. 14.

Also in this case, the Expression 23, which is depicted in FIG. 15, can be derived in the same manner as the Expression 10 is derived from the Expressions 7-9.

Also in this case, the estimated melt pressure value $\hat{\delta}$ can be derived without containing any differential term. Accordingly, it is possible to realize a control system excellent in resistance against noises.

Expression 22 is replaced by the following Expression 24.

$$\hat{X}' = D\hat{X} + Bu + Cv - Ey \quad \text{[Expression 24]}$$

Figure 5:
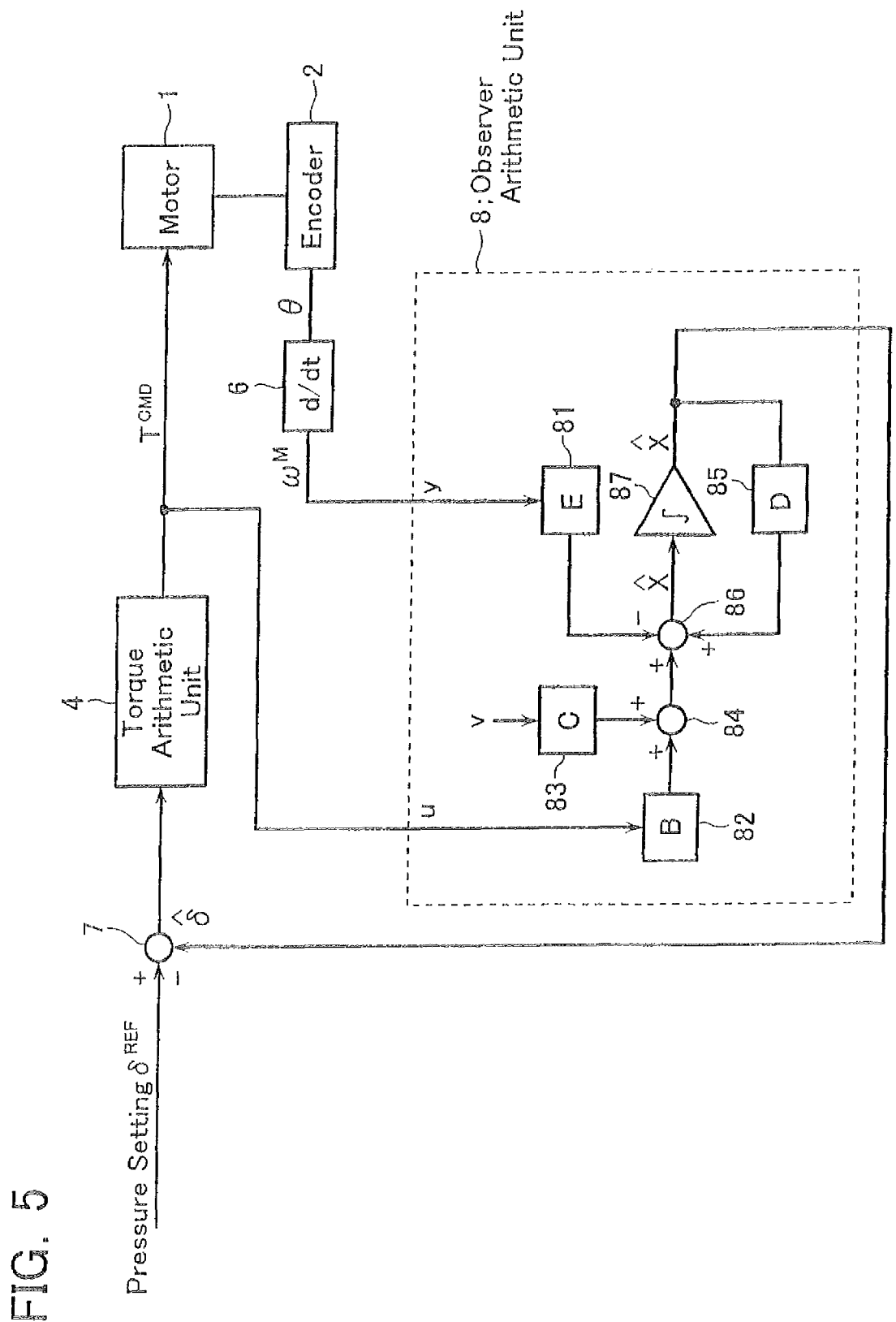
FIG. 5 is a detailed block diagram of a controller for the electric injection molding machine according to the embodiment.

FIG. 5 is a block diagram showing details of an observer arithmetic unit 8 operative to execute the computation of Expression 24.

The positional information θ output from the encoder 2 is differentiated at the differentiator 6 into the angular velocity $\omega^M$, which is sent as y through an adjuster 81 and adjusted into amplitude corresponding to the coefficient $E = (d_1, d_2, d_3, d_4)$.

On the other hand, a torque command value $T^{CMD}_{-1}$, obtained immediately before, is adjusted as u at an adjuster 82 into amplitude corresponding to the coefficient $B = (1/J^M, 0, 0, 0)$. On the other hand, previously obtained v (=the dynamic frictional resistance $F_d(\omega^L)$) is adjusted at an adjuster 83 into amplitude corresponding to the coefficient $C = (0, 1/J^L, 0, 0)$. This value is added at an adder 84 to the output from the adjuster 82. In addition, an estimated value $\hat{X}_{-1}$, obtained immediately before, is adjusted at an adjuster 85 into amplitude corresponding to the coefficient D. At an adder 86, the output from the adder 84 is added to the output from the adjuster 85. From the sum, the output from the adjuster 81 is subtracted to obtain the differentiated value shown in Expression 24 that is derived from $\hat{X}$ or the estimated value of X. This value is integrated at an integrator 87 to obtain the estimated value $\hat{\delta}$ based on Expression 23.

The estimated melt pressure value $\hat{\delta}$ thus obtained is subtracted from the target pressure setting $\delta^{REF}$ at the adder 7 and the resultant difference is fed to the torque arithmetic unit 4 to compute the torque command value $T^{CMD}$, which is fed back to the motor 1.

Figure 6:
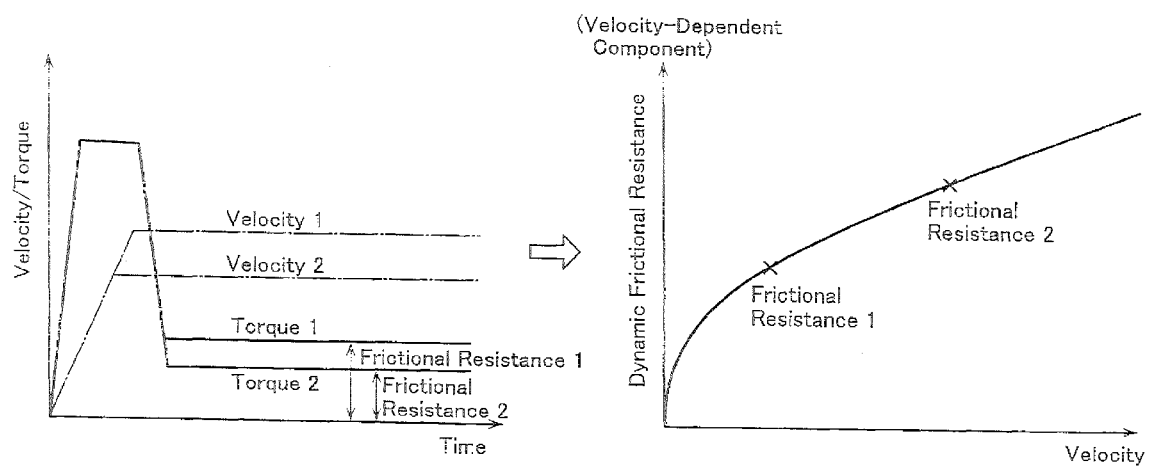
FIG. 6 is an illustrative view of a method of acquiring a velocity-dependent component of the dynamic frictional resistance in the electric injection molding machine.
Figure 7:
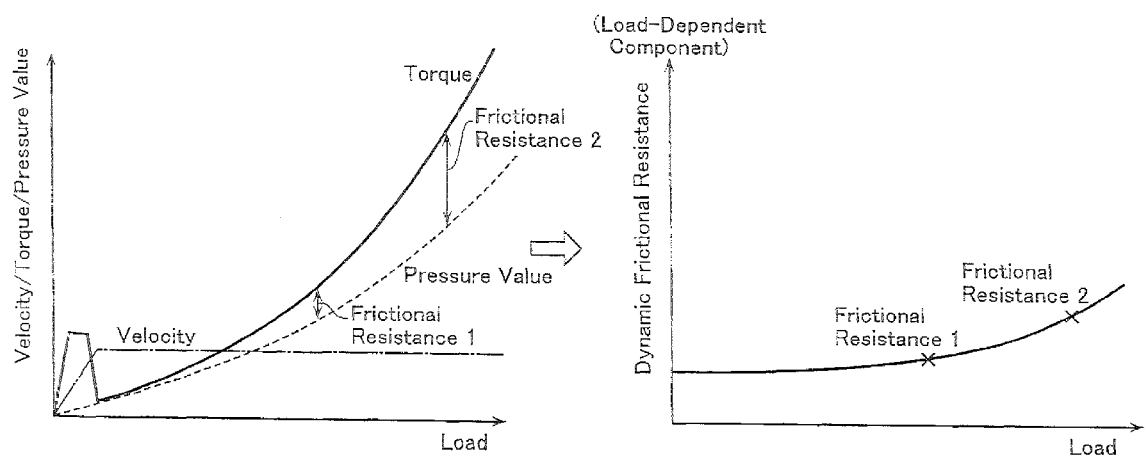
FIG. 7 is an illustrative view of a method of acquiring a load-dependent component of the dynamic frictional resistance in the electric injection molding machine.

The dynamic frictional resistance $F_d(\omega^L)$ is determined in a method (calibration method), which is described next with reference to FIGS. 6 and 7.

A dynamic frictional resistance model is herein defined as a sum of a velocity-dependent component and a load-dependent component. The velocity-dependent component can be derived from a relation between a motor velocity (or position) and a torque value (or current value) at the time of injection with no resin loaded. The load-dependent component can be derived from a relation between a torque value (or current value) and a pressure value at the time of injection with a plugged nozzle.

Velocity-Dependent Component

In steady state, as $\omega^{M'}=0$ and $\omega^{L'}=0$, the left sides in the first and second equations of Expression 16 both become zero. Therefore, the dynamic frictional resistance $F_d(\omega^L)$ is represented as follows.

$$F_d(\omega^L) = -(R^L/R^M)T^{CMD} - \delta \quad \text{[Expression 25]}$$

Accordingly, it depends only on the torque at the time of injection with no resin loaded (regarded as δ=0). Therefore, as shown in the left half of FIG. 6, the torque value 1, 2 is measured to obtain the dynamic frictional resistance 1, 2 when injection with no resin loaded varies the velocity as 1, 2 on forward movement for injection. This is plotted on the graph in the right half of FIG. 6 to obtain a characteristic curve of the velocity-dependent component. The velocity-dependent component on backward movement for injection can be obtained similarly.

Load-Dependent Component

Next, a calibration tool is prepared with an attached sensor for measuring pressure (such as a pressure sensor and a strain gauge). Then, the torque value and the pressure value are measured on injection with a plugged nozzle tip to obtain the dynamic frictional resistance 1, 2 as shown in the left half of FIG. 7. This is plotted, on the graph in the right half of FIG. 7 to obtain a characteristic curve of the load-dependent component.

These velocity-dependent component and load-dependent component in combination can be employed as the dynamic frictional resistance model of the injection mechanism for pressure estimation.

The invention claimed is:

1. An apparatus for controlling pressure in an electric injection molding machine, comprising:
    an observer arithmetic unit operative to derive an estimated melt pressure value $\hat{\delta}$, based on an observer, from an angular velocity ω of a motor operative to propel forward a screw in an injection molding machine and a torque command value $T^{CMD}$ given to said motor; and
    a torque arithmetic unit operative to calculate said torque command value $T^{CMD}$ for said motor using said estimated melt pressure value $\hat{\delta}$ derived at said observer arithmetic unit and feed back said torque command value to said motor, wherein
    said observer arithmetic unit comprises:
    a first and second adders operative to subtract the angular velocity ω from an estimated angular velocity value $\hat{\omega}_{-1}$ obtained at immediately preceding processing;
    a first and a second adjusters operative to adjust an output value $(\hat{\omega}_{-1} - \omega)$ from the first and second adders into amplitude corresponding to coefficients $d_1$ and $d_2$, respectively;
    a third adder operative to add the torque command value $T^{CMD}_{-1}$ and an estimated melt pressure value $\hat{\delta}_{-1}$ obtained immediately preceding processing;
    a fourth adder operative to add an output value $(T^{CMD}_{-1} + \hat{\delta}_{-1})$ from the third adder and a frictional resistance $F(\omega)$ over the electric injection molding machine;
    a third adjuster operative to adjust an output value $(T^{CMD}_{-1} + \hat{\delta}_{-1} + F(\omega))$ from the fourth adder into amplitude corresponding to a coefficient 1/J;
    a fifth adder operative to add outputs from the first and third adjusters;

a first integrator operative to integrate an output from the fifth adder to obtain an estimated angular velocity value $\hat{\omega}$; and a second integrator operative to integrate an output from the second adjuster to obtain the estimated melt pressure value $\hat{\delta}$.

2. An apparatus for controlling pressure in an electric injection molding machine, comprising:

an observer arithmetic unit operative to derive an estimated melt pressure value $\hat{\delta}$, based on an observer, from an angular velocity $\omega$ of a motor operative to propel forward a screw in an injection molding machine and a torque command value $T^{CMD}$ give to said motor; and a torque arithmetic unit operative to calculate said torque command value $T^{CMD}$ for said motor using said estimated melt pressure value $\hat{\delta}$ derived at said observer arithmetic unit and feed back said torque command value to said motor, wherein said observer arithmetic unit comprises:

a first adjuster operative to adjust the angular velocity $\omega$ into amplitude corresponding to coefficient E;

a second adjuster operative to adjust a torque command value $T^{CMD}_{-1}$ obtained immediately preceding processing into amplitude corresponding to coefficient B;

a third adjuster operative to adjust a previously obtained dynamic frictional resistance $F_d(\omega^L)$ into amplitude corresponding to coefficient C;

a first adder operative to add output values from the second and third adjusters;

a fourth adjuster operative to adjust an estimated melt pressure value $\hat{\delta}_{-1}$ obtained immediately preceding processing into amplitude corresponding to coefficient D;

a second adder operative to add outputs from the second and fourth adjusters and subtract an output from the first adjuster from a sum of the outputs from the second and fourth adjusters; and an integrator operative to integrate an output from the second adder to obtain an estimated melt pressure value $\hat{\delta}$.

3. The apparatus for controlling pressure in an electric injection molding machine according to claim 2, wherein said first adjuster operative to adjust the angular velocity $\omega$ into amplitude corresponding to the coefficient $E=(d_1, d_2, d_3, d_4)$, said second adjuster operative to adjust a torque command value $T^{CMD}_{-1}$ obtained immediately preceding processing into amplitude corresponding to the coefficient $B=(1/J^M, 0, 0, 0)$, and wherein said third adjuster operative to adjust a previously obtained dynamic frictional resistance $F_d(\omega^L)$ into amplitude corresponding to the coefficient $C=(0, 1/J^L, 0, 0)$.

* * * * *

UNITED STATES PATENT AND TRADEMARK OFFICE
CERTIFICATE OF CORRECTION

PATENT NO. : 7,904,196 B2
APPLICATION NO. : 12/563613
DATED : March 8, 2011
INVENTOR(S) : Yoshinori Okazaki It is certified that error appears in the above-identified patent and that said Letters Patent is hereby corrected as shown below:

Title page, item 30, col. 1 should read as follows:

--Related/Priority Application

This application is a Continuation of United States Patent Application Serial No. 10/541,470, filed on January 5, 2006. United States Patent Application Serial No. 10/541,470 was a National Phase filing regarding International Application No. PCT/JP2004/013318, filed on September 13, 2004. International Application No. PCT/JP2004/013318 relies upon Japanese Patent Application No. 2003-324893, filed on September 17, 2003, for priority.--

Signed and Sealed this
Twentieth Day of December, 2011

David J. Kappos
*Director of the United States Patent and Trademark Office*